Nov. 7, 1933.  C. B. DEMPSTER ET AL  1,934,488
ROAD MAINTAINER
Filed July 26, 1932  2 Sheets-Sheet 1
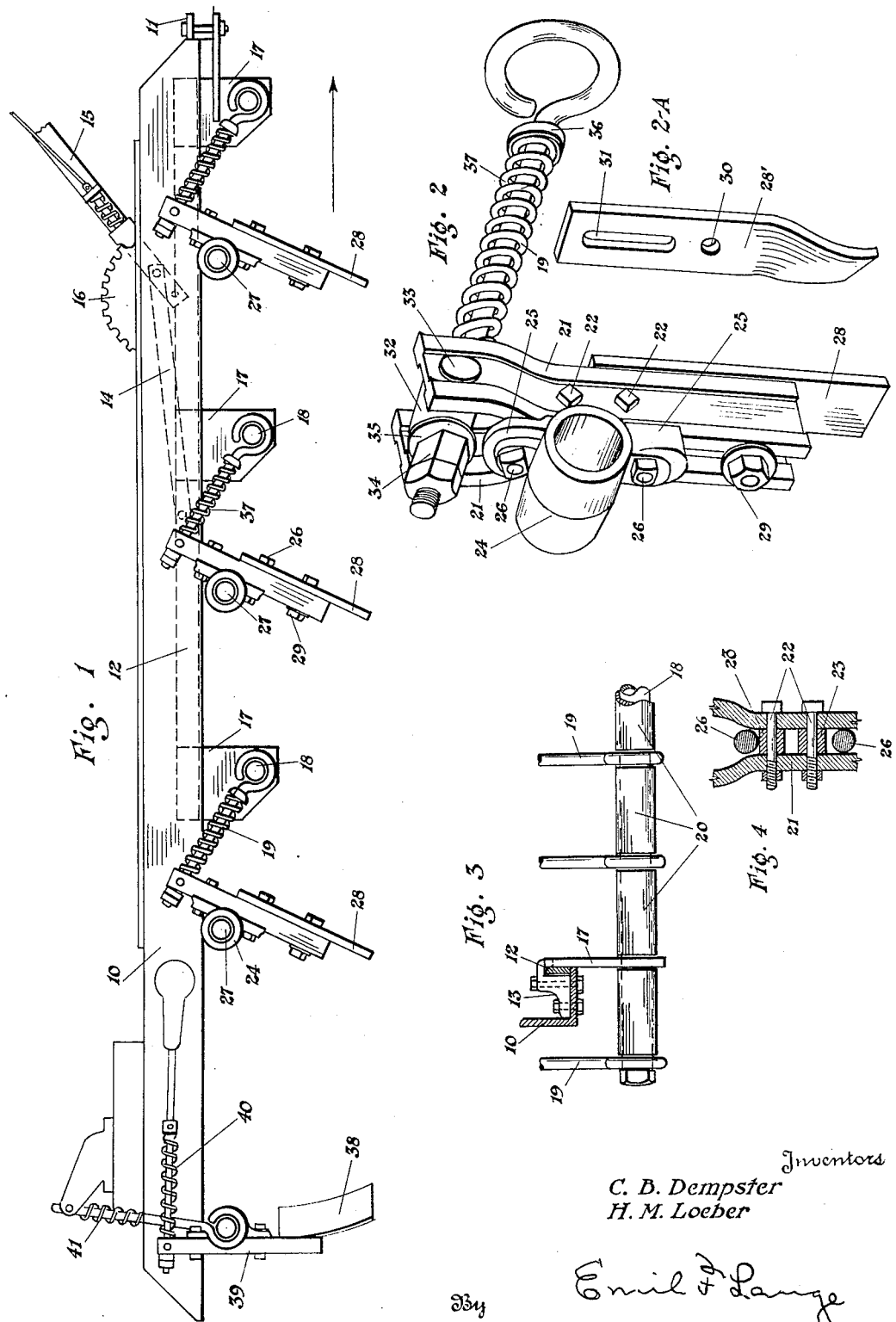
Inventors
C. B. Dempster
H. M. Loeber
By Emil F. Lange
Attorney

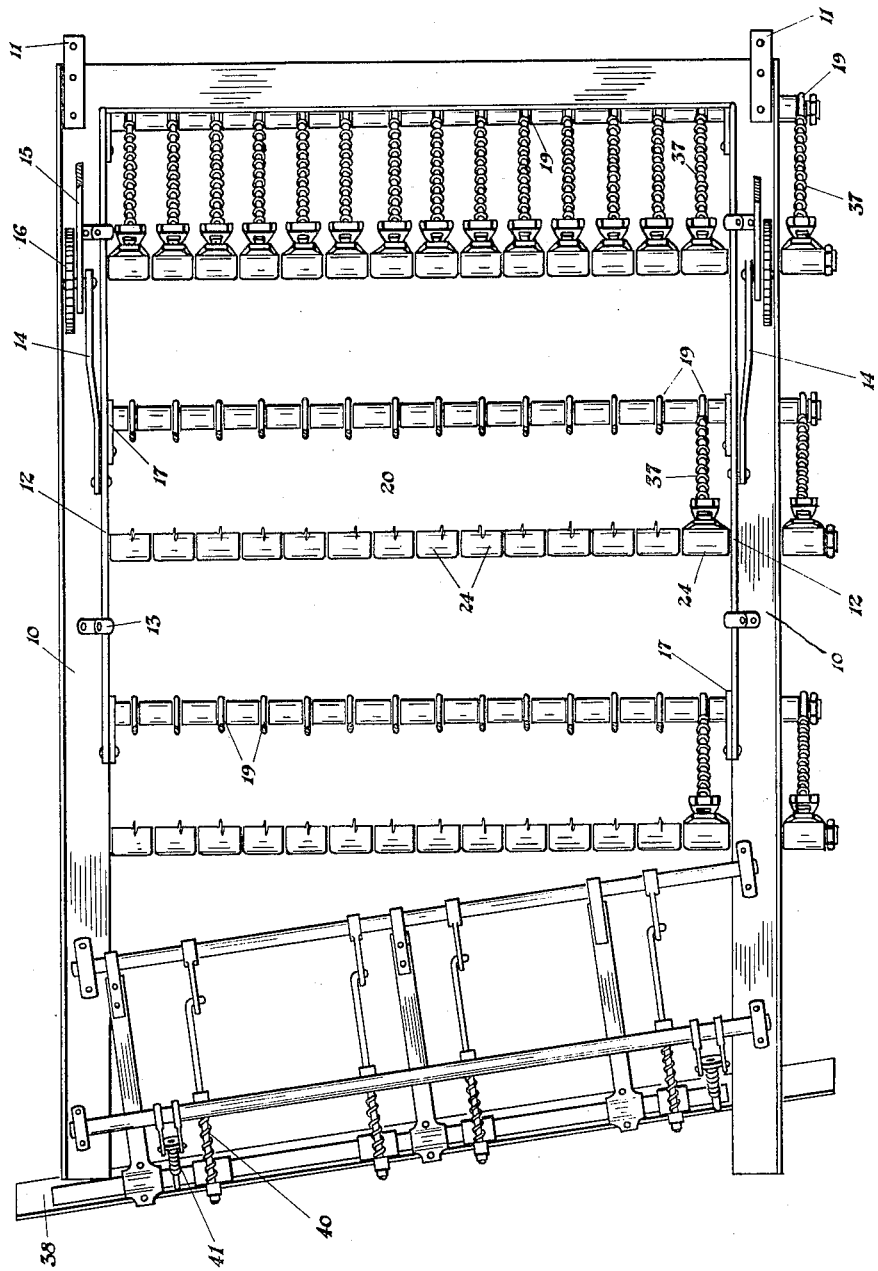

Patented Nov. 7, 1933

1,934,488

UNITED STATES PATENT OFFICE 1,934,488

ROAD MAINTAINER

Charles B. Dempster and Herman M. Loeber, Beatrice, Nebr., assignors to Dempster Mill Manufacturing Company, Beatrice, Nebr., a corporation of Nebraska Application July 26, 1932. Serial No. 624,773

8 Claims. (Cl. 37—143)

Our invention relates to road maintainers for removing irregularities in the surface of gravelled and other highways for leaving the surface of the road in smooth condition. The primary object of the invention is the provision of a plurality of scraper blades which operate individually both for removing elevations in the road surface and for filling in depressions.

Another of our objects is the provision of a road maintainer having a plurality of spring held scraper blades which automatically adjust themselves to irregularities in the road surface.

Another of our objects is the provision of a road maintainer having a plurality of scraper blades all of which are simultaneously adjustable in their angular relation to the road surface.

Another object which we have in view is the provision of scraper blades which are adjustable on their supports and which are easily removable from their supports when it becomes necessary to replace them with new blades.

Having in view these objects and others which will be pointed out in the following description, we will now refer to the drawings, in which Figure 1 is a view in side elevation of the entire implement.

Figure 2 is a perspective view of one of the scraping units and its mounting.

Figure 2A is a view in perspective of a blade which is slightly modified.

Figure 3 is a front elevational view of a fragment of the implement showing the mounting of the individual scraper supports and showing one side rail of the implement in section.

Figure 4 is a sectional view of a portion of the scraper support.

Figure 5 is a plan view of the implement, some of the scrapers and their connections being omitted.

The implement frame includes side members 10 which are suitably united and braced. At the forward extremity of the frame are clevis hitches 11 through which the implement as a whole may be drawn either by draft animals or by a tractor. Adjacent the side members 10 are slides 12 shown in dotted lines in Figure 1 and shown in section in Figure 3. These slides ride on the lower horizontal surfaces of the angle steel side members 10 as shown in Figure 3 and they are held in place by means of castings 13 which are securely bolted to the side members and which overhang the upper edges of the slides 12. The slides are each secured through a link 14 to the lever 15 which has the usual pawl connection with the arcuate rack 16. It will be evident that movement of the lever 15 will cause the slide 12 to move either forwardly or rearwardly to any desired position in which it may be latched by means of the latch on the lever 15.

Each slide 12 is provided with a plurality of depending hangers 17 which are rigidly secured to the slide. Each hanger 17 has a rod 18 for receiving the eyes of the eye bolts 19. As shown in Figure 3, the rods 18 are each provided with a plurality of collars 20 for spacing the eye bolts 19 at the proper distance apart.

The scraper support is best shown in Figure 2. This consists of two heavily ribbed straps 21 which are spaced apart in their lower portions and which diverge in their upper portions to form a yoke. The two straps are held together by means of bolts 22 which pass through both straps and through the spacing blocks 23 which maintain the straps 21 in spaced apart relation. The bearing casting 24 is provided with two ears 25 which lie in a common plane and with a flat surface to seat snugly against the edges of the two straps 21. The bearing bracket 24 with its ears 25 is secured to the straps 21 by means of bolts 26. The entire scraper support is then secured to the implement frame with its bearing on a rod 27 which is secured to the under side of the frame 10 as shown in Figure 1.

The scraper blade 28 is adjustably secured to the blade support by means of the lower of the bolts 26 and the bolt 29 both of which pass through the space between the straps 21. As shown in Figure 2A the blade 28' is provided with an aperture 30 and with a slot 31. The lower of the bolts 26 is fixed in position in the lower ear 25 but the bolt 29 has up and down movement in the space between the two straps 21. The bolt 26 passes through the slot 21 while the bolt 29 passes through the aperture 30. By loosening the lower of the bolts 26 and the bolt 29, the scraper blade may be moved up and down with the blade moving relatively to the lower of the bolts 26 by carrying the bolt 29 with it. When the blade is in proper adjustment the two bolts may be tightened to maintain the adjusted position. The blade may be either straight as shown at 28 in Figure 2 or it may be slightly curved as shown in the blade 28'.

In the upper or yoke portion of the support formed by the straps 21 there is a block 32 which is connected through trunnions 33 to the straps 21. The blocks 32 are apertured for receiving the eye bolts 19 in which relation they may be held by means of nuts 34 and washers 35. The eye bolt is provided at its eye end with a collar 36 which serves as an abutment for the spring 37 surrounding the eye bolt 19. The opposite end of the spring 37 abuts against the block 32.

In the forward movement of the implement over the road surface the various blades 28 will encounter varying resistances which are cushioned by the springs 37. If the resistance on any blade 28 becomes too great, the entire blade support may swing on its axis 27 against the compression of the spring 37 to thereby prevent breakage of the scraping blades. The blades are rearwardly and downwardly inclined but this position may be varied according to the road surface or according to the conditions of the surface soil of the road. By manipulating the lever 15 to cause the slide 12 to move forwardly or rearwardly, the angle of all of the scrapers to the road surface may be either increased or decreased.

The entire implement rests on the scraper blades 28 which thus accomplish their work through the weight of the implement. The weight of the implement will naturally result in a compression of the springs 19, the extent of the compression depending on the road surface at the spots where the individual blades 28 rest. In case of a depression the blade 28 is in its normal angular position and it bears very lightly against the surface. In case of an elevation in the road the blade 28 will compress its spring to a considerable extent and it will bear very heavily against the road surface. The result of this action is that very little cutting is done in the depressed portions of the road but any protuberances in the road surface result in increased cutting action of the scraper blades 28. The road surface of course changes continuously so that any particular blade may be called upon to do both heavy and light work, the result being that the average wear on the blades is about equal.

When a blade becomes worn, it may be adjusted by loosening the nuts on the lower bolt 26 and the bolt 29, these nuts being again tightened after the blade has been shoved into the adjusted position. When a blade becomes so badly worn that it is practically useless, it may easily be removed and replaced by a new blade. These blades are cheap as compared with the long scraper blades usually used on road maintainers and they are very economical especially when the blade suffers an injury at some particular spot. For example, an imbedded rock in the road surface is very apt to injure the long blade but its replacement is too expensive. If one of the blades 28 suffers such an injury, it may easily be replaced at very low cost. The blades 28 are moreover much less subject to injury than are the long scraper blades usually used. An imbedded rock in the road surface would merely compress the spring 19 and cause the scraper blade 28 to pass over the rock.

When it becomes desirable to transport the loosened soil from the road surface toward the middle of the road for the purpose of filling any depressions or grooves in the road, a long scraper blade 38 may be utilized for this purpose, the blade 38 being diagonally disposed with reference to the line of draft and following the blades 28. The blade 38 may be secured to a standard 39 which is cushioned by means of the springs 40 and 41. The blade 38 is not called upon for any cutting action but it merely transports the soil which is loosened by the blades 28.

Having thus described our invention in such full, clear, and exact terms that its construction and operation will be readily understood by others skilled in the art to which it pertains, what we claim as new and desire to secure by Letters Patent of the United States is:

1. A road maintainer including a main frame supported on a plurality of downwardly and rearwardly inclined scraper blades, each of said blades having a support secured to said frame to rock thereon, a slide secured to said frame to move forwardly or rearwardly thereon, a link pivotally secured to said slide at a point forward of said support and secured at the opposite extremity thereof to said support, and means for sliding said slide for adjustably altering the angular relation between said scraper blade and said frame.

2. A highway maintainer including a main frame and a rearwardly and downwardly inclined scraper, said scraper having a pair of spaced apart rocking connections with said frame, one of said connections being forward of the other and having an adjustably slidable relation to said frame for adjustably varying the inclination of said scraper to said frame, and means for latching said forward connections in adjusted position.

3. In a highway maintainer having a main frame, a scraper blade support including a pair of spaced apart rigid straps, a bearing secured to said straps and adapted for attachment to the main frame, a trunnion block secured between said straps, a link passing through said block and having means for attachment to the main frame at a point forward of said straps, and a compression spring surrounding said link.

4. In a highway maintainer having a main frame, a scraper blade support including a pair of spaced apart rigid straps having an open space therebetween in the lower portion thereof, a scraper blade having a lower aperture and an upper slot, a fixed bolt between said straps and passing through the slot of said tooth, a bolt slidable in the open space between said straps and passing through the aperture of said blade, a bearing secured to said straps and adapted for attachment to the main frame, a trunnion block secured between said straps, a link passing through said blocks and having means for attachment to the main frame at a point forward of said straps, and a compression spring surrounding said link.

5. In a highway maintainer, a main frame, a rod positioned transversely in said main frame, a plurality of downwardly and rearwardly inclined scraper blades and scraper blade supports journalled on said rod at intermediate points of said supports, a second transverse rod forward of the first said rod, links between said second transverse rod and the upper extremities of said scraper blade supports, and compression springs surrounding said links.

6. In a highway maintainer, a main frame, a rod positioned transversely in said main frame, a plurality of downwardly and rearwardly inclined scraper blades and scraper blade supports journalled on said rod at intermediate points of said supports, a second transverse rod forward of the first said rod, links between said second transverse rod and the upper extremities of said scraper blade supports, and compression springs surrounding said links, said second transverse rod being adjustable in a fore and aft direction for varying the inclination of said scraper blades to the road surface.

7. In a highway maintainer, a main frame, a rod positioned transversely in said main frame, a plurality of downwardly and rearwardly inclined scraper blade supports journalled on said rod with said supports projecting both above and below said rod, scraper blades releasably and adjustably secured to said supports, a second transverse rod forward of the first said rod, links connecting the upper extremities of said supports to said second transverse rod, and compression springs surrounding said links.

8. In a highway maintainer, a main frame, a rearwardly and downwardly inclined scraper blade support and a pivot connecting said support to said main frame, said pivot being transverse to said main frame and being positioned intermediate the extremities of said support, a hanger secured to said main frame for fore and aft sliding movement, a link pivotally secured to the lower portion of said hanger and slidably secured to the upper portion of said support, means associated with said link for yieldably urging said support and its scraper into operative position, and means for sliding said hanger for varying the inclination of said support.

CHARLES B. DEMPSTER.
HERMAN M. LOEBER.